United States Patent [19]

Suzuki et al.

[11] Patent Number: 4,584,482
[45] Date of Patent: Apr. 22, 1986

[54] NOISE ERASING METHOD AND APPARATUS FOR STIMULABLE PHOSPHOR SHEET

[75] Inventors: Toshiaki Suzuki; Kazuo Horikawa, both of Kanagawa, Japan

[73] Assignee: Fuji Photo Film Co., Ltd., Kanagawa, Japan

[21] Appl. No.: 440,046

[22] Filed: Nov. 8, 1982

[30] Foreign Application Priority Data

Nov. 9, 1981 [JP] Japan ................................ 56-179287

[51] Int. Cl.⁴ ............................................. G01V 1/161
[52] U.S. Cl. ................................ 250/459.1; 250/327.2
[58] Field of Search ............... 250/327.2, 484.1, 459.1, 250/458.1

[56] References Cited

U.S. PATENT DOCUMENTS

| 4,236,078 | 11/1980 | Kotera et al. | 250/327.2 |
|---|---|---|---|
| 4,239,968 | 12/1980 | Kotera et al. | 250/327.2 |
| 4,258,264 | 3/1981 | Kotera et al. | 250/327.2 |
| 4,276,473 | 6/1981 | Kato et al. | 250/327.2 |
| 4,284,889 | 8/1981 | Kato et al. | 250/337 |
| 4,315,318 | 2/1982 | Kato et al. | 382/6 |
| 4,346,295 | 8/1982 | Tanaka et al. | 250/327.2 |
| 4,387,428 | 6/1983 | Ishida et al. | 364/414 |
| 4,394,581 | 7/1983 | Takahashi et al. | 250/484.1 |
| 4,400,619 | 8/1983 | Kotera et al. | 250/327.2 |
| 4,439,682 | 3/1984 | Matsumoto et al. | 250/327.2 |

FOREIGN PATENT DOCUMENTS

0077676 4/1983 European Pat. Off. ......... 250/327.2

Primary Examiner—Alfred E. Smith
Assistant Examiner—Constantine Hannaher
Attorney, Agent, or Firm—Sughrue, Mion, Zinn, Macpeak and Seas

[57] ABSTRACT

In a radiation image recording and read-out system in which a stimulable phosphor sheet is repeatedly used for recording radiation images, and noise developing due to residual radiation energy on the phosphor sheet is eliminated by exposing the phosphor sheet to erasing light prior to radiation image recording step, the level of residual radiation energy is detected, and the amount of exposure of the phosphor sheet to erasing light is controlled according to the detected level of residual radiation energy. The exposure amount is controlled to erase residual radiation energy to a level within the range between 0.01 and 0.0001 with the maximum of the originally stored radiation energy taken as 100.

15 Claims, 7 Drawing Figures

NOISE ERASING METHOD AND APPARATUS FOR STIMULABLE PHOSPHOR SHEET

BACKGROUND OF THE INVENTION

1. Field of the Invention

This invention relates to a method of and apparatus for effective erasing noise developing in a reproduced visible image due to repeated use of the stimulable phosphor sheet in a radiation image information recording and reproducing method where the stimulable phosphor sheet is exposed to a radiation to record a radiation image therein and then exposed to a stimulating ray to emit light in the pattern of the stored image, the emitted light is converted to an electric signal, the electric signal is processed as desired, and a visible image corresponding to the radiation image is reproduced by use of the electric signal.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to a stimulating ray such as visible light, light is emitted from the phosphor in proportion to the stored energy of the radiation. A phosphor exhibiting such properties is referred to as a stimulable phosphor.

As disclosed in U.S. patent application Ser. No. 220,780, U.S. Pat. No. 4,387,428, Japanese Unexamined Patent Publication No. 56(1981)-11395, U.S. Pat. Nos. 4,258,264, 4,276,473 and 4,315,318, it has been proposed to use the stimulable phosphor for recording a radiation image of the human body for medical diagnosis, or the like. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce a visible image of a quality suitable for viewing and diagnostic purposes.

In the radiation image recording and reproducing method described above, the final visible image may be reproduced in the form of a hard copy or may be displayed on a cathode ray tube. The stimulable phosphor sheet used in this method may be in any of various forms such as a panel, drum or the like, which are herein generally referred to as sheets. For economical reasons, it is desirable that the stimulable phosphor sheet is reusable in many separate radiographic operations.

In order to reuse the stimulable phosphor sheet, it is necessary that the stimulable phosphor sheet to be reused is made completely free from the previously stored radiation image. Theoretically, the radiation energy of the radiation image stored in the stimulable phosphor sheet should be eliminated when the sheet is scanned with a stimulating ray of a sufficient intensity to cause light to emit therefrom in the pattern of the stored radiation image in the course of the radiation image recording and reproducing process as described above. Actually, however, the stored radiation energy cannot be completely eliminated only with the stimulating ray used to scan the stimulable phosphor sheet during the aforesaid process. Thus a part of the previously stored radiation image remains in the once-used stimulable phosphor sheet and inconveniently causes noise to occur in the visible image reproduced from the stimulable phosphor sheet when it is reused. In order to successfully reuse the stimulable phosphor sheet, any such residual radiation image thereon must be erased completely before reuse.

The inventors conducted experiments to find what level of radiation energy of the residual image in the resued phosphor caused noise to develop in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum of the original level is 100.

Further, a stimulable phosphor contains a trace of radioactive isotopes such as $^{226}$Ra and $^{40}$K, which emit radiations and cause the stimulable phosphor sheet to store the emitted radiation energy even when the sheet is not being used in radiography. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also cause noise to appear in the visible radiation image reproduced from a reused stimulable phosphor sheet. The level of the fog developing in the phosphor is generally about 0.1 to 0.01 based on the maximum of the stored original radiation energy which is taken as 100 as described above. It has also been found that the fog must be erased to a level between about 0.01 and 0.0001 in order to prevent the fog from developing detrimental noise in the next radiographic operation.

In order to avoid noise occurring in the reproduced visible radiation image due to the noise originating from the radiation image previously stored in a stimulable phosphor sheet and due to the fog developing during the storage of the sheet, the Applicant has proposed in U.S. patent application Ser. No. 168,795, U.S. Pat. No. 4,400,619, to expose the stimulable phosphor sheet to light having the wavelength within range of the stimulating light wavelength of the phosphor before recording a radiation image in the stimulable phosphor sheet, thereby to discharge the detrimental radiation energy therefrom to an acceptable extent. With this method, however, erasing of the residual radiation image and fog in the stimulable phosphor sheet must be effected immediately before using the sheet for radiography. This is necessary to minimize the fog developing in the stimulable phosphor sheet after the erasing is conducted. Further, in order to erase the radiation energy of the previously stored radiation image to the order of $10^{-4}$ to $10^{-6}$, the phosphor must be exposed to a high illuminance for a long length of time, for example to 30,000 1× for 100 to 1,000 seconds using a tungsten-filament lamp. This necessitates a large-scale erasing apparatus and, in addition, erasing must be started a considerable length of time before a radiograph is to be taken. Thus it is very difficult in practical use to carry out such a troublesome erasing operation each time a radiograph is to be taken. Further, it is very inconvenient in practical use to install a large-scale erasing apparatus in the vicinity of the radiographic equipment.

The inventors conducted various experiments with respect to the aforesaid two kinds of causes of noise, and have found that the erasability thereof differs considerably between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same. That is to say, after the previously stored image is erased from the level of 100 to about 0.1, the resulting residual image suddenly becomes difficult to erase. For example, the previously stored image can be erased to a level of about 0.1 when exposed to light at an illuminance of 10,000 1× for about 10 seconds, but it takes about 100 seconds for the resulting residual image to be further erased to a level of 0.01. In contrast, the fog of the level of about 0.1 can be erased in less than 1 second at an illuminance of 10,000 1×.

Based on the above-mentioned observations, the inventors have already proposed in U.S. patent application Ser. No. 338,734, U.S. Pat. No. 4,439,682, a noise erasing method comprising two erasing steps wherein the first erasing which requires a long period of time to erase the previously stored image is carried out at an appropriate point of time after the radiation image is stored in a stimulable phosphor and scanned with a stimulating ray, and the second erasing for the fog which can be erased quickly is conducted immediately before the next radiographic operation.

According to this proposed method, the first erasing in which the radiation image previously stored in the stimulable phosphor is to be erased at a high illuminance for a long period of time by use of a large-scale apparatus can be carried out at an appropriate point of time after the stimulable phosphor sheet has been used for a radiographic operation. After the first erasing is finished, the stimulable phosphor sheet can be transferred to the vicinity of the site where it is to be used for the next radiographic operation. Thereafter, immediately before the next radiographic operation is to be started, the second erasing can be conducted for a short length of time to erase the fog, if any, by use of a simple small-scale apparatus. Thus this method can effectively eliminate the causes of noise and provide a noise-free reproduced visible radiation image.

However, the above-mentioned method is not economical since large energy is required to conduct the first erasing. Thus, a need exists for a method and apparatus which can erase noise more economically.

SUMMARY OF THE INVENTION

The primary object of the present invention is to provide a method of economically erasing noise due to a radiation image previously stored in the stimulable phosphor.

Another object of the present invention is to provide an apparatus for economically erasing noise due to a radiation image previously stored in the stimulable phosphor.

The specific object of the present invention is to provide a method of and apparatus for effectively and certainly erasing noise due to a radiation image previously stored in the stimulable phosphor by use of the minimum necessary amount of energy.

Experiments conducted by the inventors revealed that the level of radiation energy remaining on the stimulable phosphor sheet varies according to the conditions for recording a radiation image on the stimulable phosphor sheet, and can take any value within the range below 100 when the maximum of the stored original radiation energy is taken as 100. It has also been found that, in order to eliminate adverse effects of noise, it is sufficient to erase residual radiation energy to a level within the range between 0.01 and 0.0001 regardless of the level of the residual radiation energy.

Accordingly, the above objects are accomplished by detecting the level of residual radiation energy remaining on the stimulable phosphor sheet, and controlling the exposure amount to erasing light according to the detected level of residual radiation energy. The term "exposure amount" as used herein means the illuminance of the erasing light multiplied by the time the stimulable phosphor is exposed to the erasing light.

In the present invention, since the level of residual radiation energy due to a radiation image previously stored in the stimulable phosphor sheet is detected in advance and the amount of exposure of the phosphor sheet to noise erasing light is controlled according to the detected residual radiation energy level, it is possible to minimize energy (illuminance×time) required to conduct noise erasing. Therefore, noise can be erased effectively and certainly.

Figure 1:
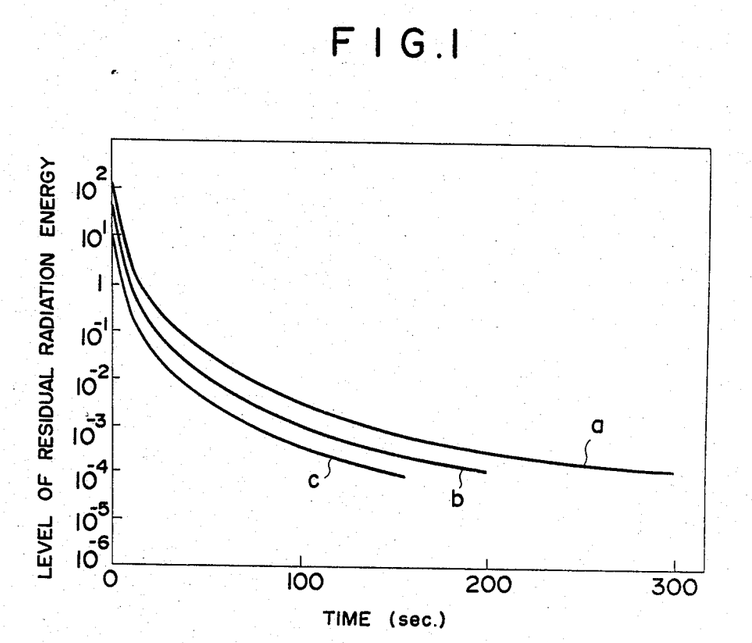
FIG. 1 is a graph showing the changes in the level of radiation energy remaining on stimulable phosphor sheets as the radiation energy is discharged therefrom upon exposure thereof to light.

For explanation, FIG. 1 shows the changes in the level of radiation energy remaining on stimulable phosphor sheets as the radiation energy is discharged therefrom when the phosphor sheets are exposed to light having an illuminance of 10,000 1×. Curves a, b and c shows the measurement results obtained when the levels of residual radiation energy remaining on the phosphor sheets prior to the exposure thereof to noise erasing light are 100, 50 and 10, respectively, with the maximum of the radiation energy of the previously stored radiation image being taken as 100. As is clearly shown in FIG. 1, the time required for the residual radiation energy on the phosphor sheet to be erased to a level, which does not develop noise in the visible image reproduced from the phosphor sheet in the subsequent recording and reproducing operations to an extent adversely affecting diagnosis, i.e. to a level within the range between 0.01 and 0.0001 greatly differs depending on the level of the radiation energy remaining on the phosphor sheet prior to the exposure thereof to noise erasing light. Namely, when the level of residual radiation energy is relatively low (curve c), erasing can be conducted by use of a small exposure amount, and it is ineffective and uneconomical to apply an unnecessarily high exposure amount to the phosphor sheet. On the other hand, when the level of residual radiation energy is high (curve a), it is necessary to employ a sufficiently high exposure amount to completely erase noise.

In the present invention, measurement of the residual radiation energy on the phosphor sheet may be conducted independently prior to erasing. Since radiation energy emitted from the phosphor sheet when it is stimulated with a stimulating ray for reading out the radiation image stored thereon is proportional to the radiation energy remaining thereon after the read-out step, it is also possible to determine the residual radiation energy based on the signal read out from the phosphor sheet.

As disclosed in Japanese Patent Application Nos. 56(1981)-165111, 56(1981)-165112, 56(1981)-165113, 56(1981)-165114 and 56(1981)-165115, and U.S. patent application Ser. No. 434,886, it has been proposed to read out the recording information of the radiation image stored on the stimulable phosphor sheet in advance (this operation is referred to as the preliminary read-out), and then to determine an appropriate read-out gain and conduct the read-out for obtaining a radiation image for use in diagnosis (this operation is referred to as the final read-out), or appropriately process the electric image signal obtained in the final read-out on the basis of the recording information obtained by the preliminary read-out. In general, the level of radiation energy stored in the stimulable phosphor prior to the preliminary read-out is in proportion to the level of residual radiation energy which remains in the phosphor after the final read-out. Therefore, it is possible to investigate the level of residual radiation energy based on the recording information obtained by the preliminary read-out. In this case, it becomes possible, for example, to control the exposure amount to erasing light by use of a read-out gain control means of the final read-out apparatus based on the experimentally determined relationship between the level of radiation energy stored in the phosphor prior to the preliminary read-out and the level of residual radiation energy remaining therein after the final read-out.

Further, since the level of radiation energy stored in the stimulable phosphor can be indirectly investigated by detecting light simultaneously emitted from the phosphor when the phosphor is exposed to a radiation at first in the recording step as disclosed in U.S. Pat. No. 4,284,889, it is also possible to determine the level of residual radiation energy by detecting the simultaneously emitted light.

As the stimulable phosphor capable of emitting light having a wavelength within the range between 300 nm and 500 nm, for example, rare earth element activated alkaline earth metal fluorohalide phosphor is preferred. One example of this phosphor is, as shown in Japanese Unexamined Patent Publication No. 55(1980)-12143, a phosphor represented by the formula $(Ba_{1-x-y}Mg_x,Ca_y)FX:aEu^{2+}$ wherein X is at least one of Cl and Br, x and y are numbers satisfying $0<x+y\leq 0.6$ and $xy\neq 0$, and a is a number satisfying $10^{-6}\leq a\leq 5\times 10^{-2}$. Another example of this phosphor is, as shown in U.S. Pat. No. 4,239,968, a phosphor represented by the formula $(Ba_{1-x}M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq 0.6$, and y is a number satisfying $0\leq y\leq 0.2$. Further, as the stimulable phosphor can be used ZnS:Cu,Pb; $BaO.xAl_2O_3:Eu$ wherein $0.8\leq x\leq 10$; and $M^{II}O.xSiO_2:A$ wherin $M^{II}$ is Mg, Ca, Sr, Zn, Cd or Ba, A is Ce, Tb, Eu, Tm, Pb, Tl, Bi or Mn, and x is a number satisfying $0.5\leq x\leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors added with at least one of a metal chloride, a metal bromide and a metal iodide as disclosed in Japanese Patent Application No. 54(1979)-150873 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. patent application Ser. No. 156,520, U.S. Pat. No. 4,394,581.

DESCRIPTION OF THE PREFERRED EMBODIMENTS

The present invention will hereinbelow be described in further detail with reference to the accompanying drawings.

Figure 2:
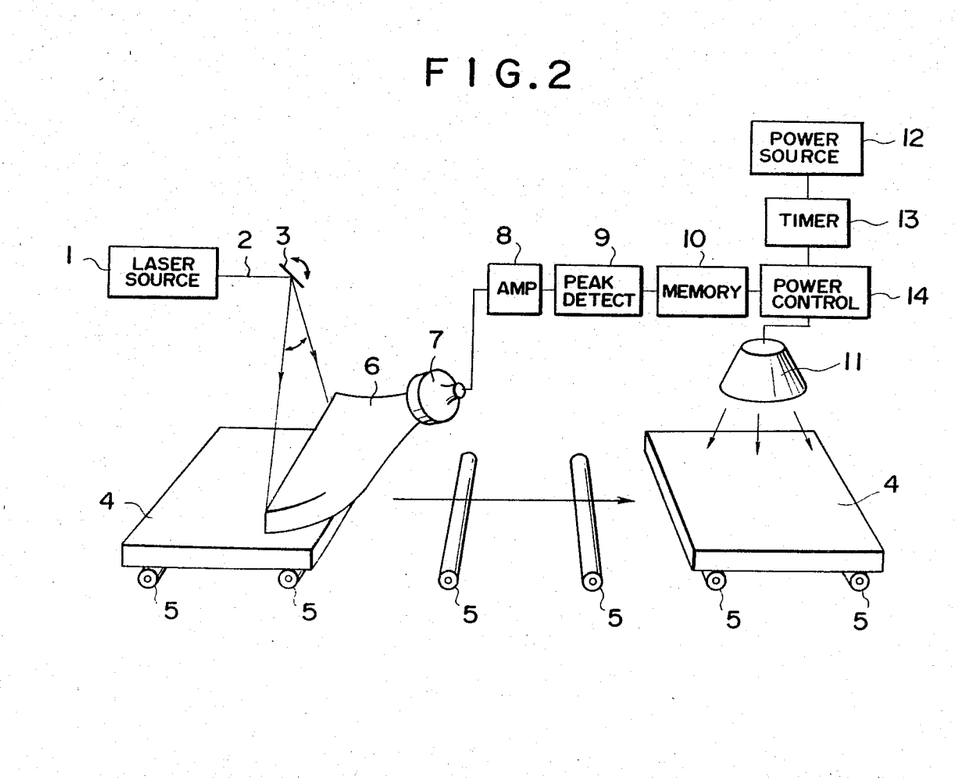
FIGS. 2 to 7 are schematic views showing the first to six embodiments of the noise erasing apparatus in accordance with the present invention.

In FIG. 2 showing the first embodiment of the apparatus in accordance with the present invention, a laser source 1 emits a laser beam 2 which is used as stimulating ray for the stimulable phosphor sheet 4. On the optical path of the laser beam 2 is positioned a light deflector 3, such as a galvanometer mirror, for one-dimensionally deflecting the laser beam 2 and causing it to impinge upon a stimulable phosphor sheet 4 carrying radiation energy stored thereon. The phosphor sheet 4 is moved at a predetermined speed by transfer rollers 5, so that the whole surface of the phosphor sheet 4 is exposed to the laser beam 2. The phosphor sheet 4 emits light upon exposure thereof to the laser beam 2, and the emitted light enters a light guiding sheet 6. The light guiding sheet 6 has a linear light input face positioned close to the scanning line on the phosphor sheet 4, and a ring-shaped light output face in close contact with the light receiving face of a photodetector 7, which may be a photomultiplier or the like. The light guiding sheet 6 is made of a transparent thermoplastic resin sheet such as an acrylic resin sheet so that the light entering from the light input face can be transmitted to the light output face by total reflection through the interior of the light guiding sheet 6. The light guiding sheet 6 may be of a shape and a material as disclosed in U.S. patent application Ser. No. 105,240, U.S. Pat. No. 4,346,295, and may be manufactured by the method disclosed in Japanese Unexamined Patent Publication No. 56(1981)-11396.

The photodetector 7 may, for example, be a photomultiplier having the S-11 type spectral sensitivity. The light receiving face of the photodetector 7 is provided with a filter for selectively transmitting the light having a wavelength within the range between 300 nm and 500 nm and cutting off the light having the wavelength distribution of the stimulating ray, so that the photodetector 7 can detect only the light emitted from the stimulable phosphor sheet 4 upon stimulation thereof with a high signal-to-noise ratio. The output of the photodetector 7 is amplified by an amplifier 8 and then sent to a peak detector 9 for detecting the maximum of the output sent from the photodetector 7, i.e. the maximum level of the residual radiation energy on the phosphor sheet 4. The value detected by the peak detector 9 is stored in a memory 10. When the detection of the residual radiation energy on the phosphor sheet 4 is finished, the phosphor sheet 4 is moved to the position below a noise erasing light source 11 and maintained there. At this stage, a timer 13 connected to a power source 12 is activated to turn on the noise erasing light source 11. The electric power applied to the noise erasing light source 11 is controlled by a power controller 14 according to the aforesaid value stored in the memory 10. When the predetermined period elapses, the timer 13 is turned off, and the noise erasing light source 11 is extinguished to finish the noise erasing operation.

Figure 3:
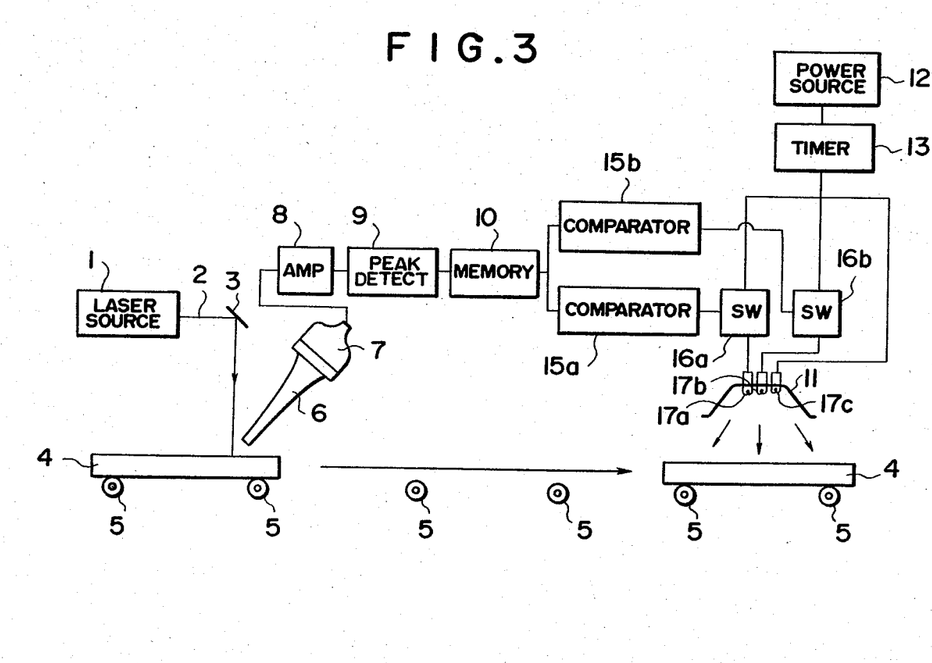

FIG. 3 shows the second embodiment of the apparatus in accordance with the present invention. In FIGS. 3 to 7, similar elements are numbered with the same reference numerals with respect to FIG. 2. The embodiment shown in FIG. 3 is similar to that shown in FIG. 2, except that the power controller 14 is replaced by comparators 15$a$ and 15$b$ having threshold values Va and Vb (Va>Vb), respectively, and switches 16$a$ and 16$b$, and the noise erasing light source 11 has light emitting sections 17$a$, 17$b$ and 17$c$ which are independent of one another. In the same way as in FIG. 2, the peak value of the photodetector 7 is stored in the memory. When the peak value is larger than the threshold value Va, both switches 16$a$ and 16$b$ are turned on to cause the light emitting sections 17$a$, 17$b$ and 17$c$ to emit light, thereby to apply the maximum illuminance to the stimulable phosphor sheet 4. When the peak value is in the range between threshold values Va and Vb, the switch 16$a$ is maintained off and the switch 16$b$ is turned on to cause the light emitting sections 17$b$ and 17$c$ to emit light at the same time. When the peak value is smaller than the threshold value Vb, both switches 16$a$ and 16$b$ are maintained off, so that only the light emitting section 17$c$ emits light. This embodiment is practically advantageous since the power controller 14 shown in FIG. 2 need not be used, and the circuit construction becomes simple. In this embodiment, it is possible to connect more than two comparators having threshold values different from one another in parallel with one another.

Figure 4:
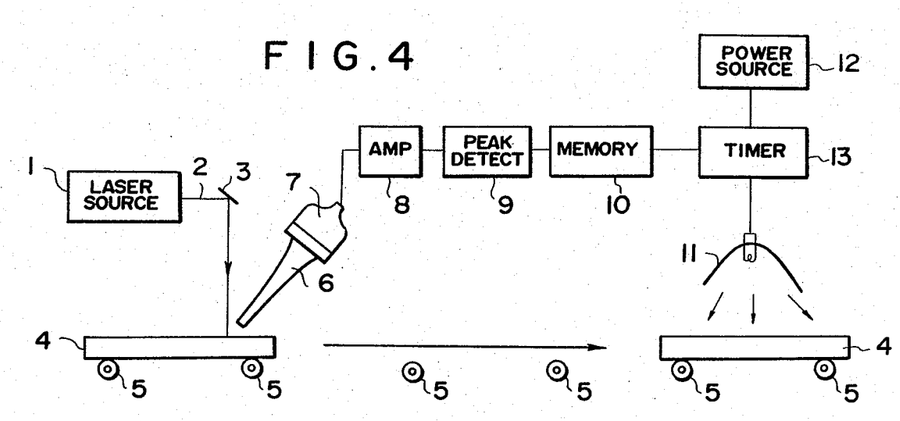

FIG. 4 shows the third embodiment of the apparatus in accordance with the present invention. This embodiment differs from the first embodiment shown in FIG. 2 in that the power controller 14 is omitted, and the timer 13 is set by the peak value of the residual radiation energy, which is stored in the memory 10. In the same way as in FIG. 2, the noise erasing light source 11 is turned on when the stimulable phosphor sheet 4 is maintained below the light source 11. When the period determined in accordance with the value stored in the memory elapses, the timer 13 is turned off, and the noise erasing light source 11 is extinguished to finish the noise erasing operation.

As the means for detecting the level of residual radiation energy in the embodiments shown in FIGS. 2 to 4, i.e. the laser source 1, galvanometer mirror 3, light guiding sheet 6, photodetector 7, amplifier 8 and the like, it is possible to use the radiation image read-out means of the read-out apparatus. Further, when the stimulable phosphor sheet 4 carries radiation energy approximately uniformly stored thereon, the peak detector 9 may be replaced by an integrating circuit. It is also possible to omit the memory 10 if the peak detector 9 or the integrating circuit is provided with a function of storing a value.

Figure 5:
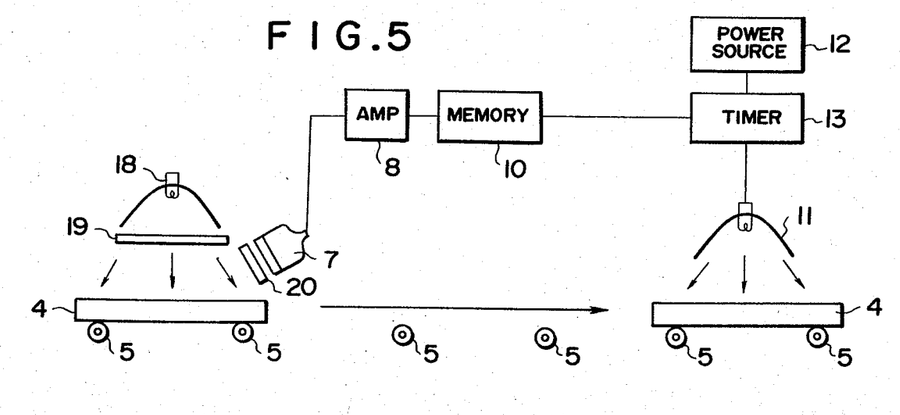

FIG. 5 shows the fourth embodiment of the apparatus in accordance with the present invention. In this embodiment, a level detecting light source 18 such as a tungsten-filament lamp is employed to detect the level of residual radiation energy. The stimulable phosphor sheet 4 carrying radiation energy stored thereon is maintained below the level detecting light source 18 and exposed to light emitted therefrom via a red filter 19. In this way, the phosphor sheet 4 is stimulated to emit light, which is detected by the photodetector 7 such as a photomultiplier. At the light receiving face of the photodetector 7 is positioned a blue filter 20 for cutting off the light emitted from the level detecting light source 18, so that the photodetector 7 can detect only the light emitted from the phosphor sheet 4 upon stimulation thereof. The output of the photodetector 7 is amplified by the amplifier 8 and then stored in the memory 10. The timer 13 is turned on for the period corresponding to the value stored in the memory 10. This embodiment is advantageous in that the means for detecting the level of residual radiation energy on the phosphor sheet 4 is simpler than the means for detecting the level of residual energy by scanning the phosphor sheet 4 with the laser beam 2 as shown in FIGS. 2 to 4. In this embodiment, the timer 13 may be replaced by a power controller.

Figures 6, 7:
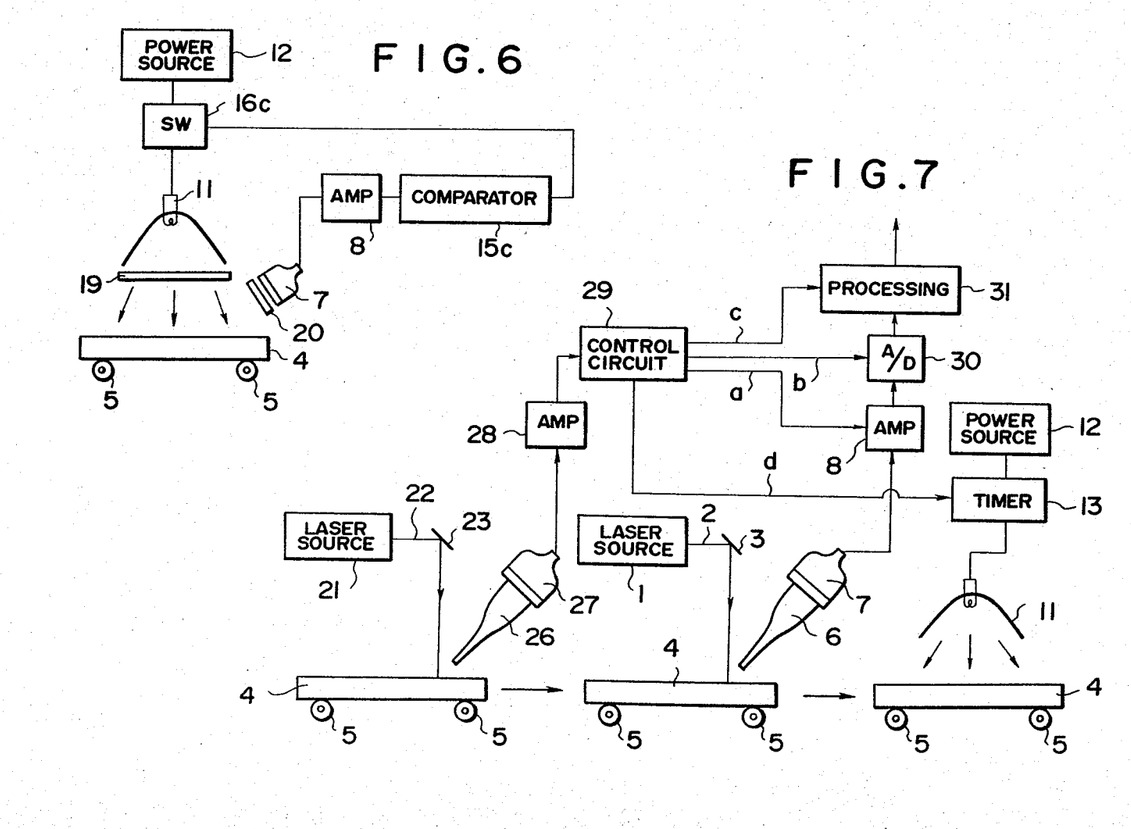

FIG. 6 shows the fifth embodiment of the apparatus in accordance with the present invention. In this embodiment, the noise erasing light source 11 is used also as the level detecting light source 18 shown in FIG. 5. The stimulable phosphor sheet 4 maintained below the noise erasing light source 11 is exposed to light emitted therefrom via the red filter 19. In this way, the phosphor sheet 4 is stimulated to emit light, which is detected by the photodetector 7 such as a photomultiplier. At the light receiving face of the photodetector 7 is positioned the blue filter 20 for cutting off the light emitted from the noise erasing light source 11, so that the photodetector 7 can detect only the light emitted from the phosphor sheet 4 upon stimulation thereof. The output of the photodetector 7 is amplified by the amplifier 8 and entered into a comparator 15$c$, which judges whether the detected energy level is above the range between 0.01 and 0.0001. When it is above this range, a switch 16$c$ connected to the power source 12 is maintained in the turned-on condition to make the noise erasing light source 11 emit light onto the phosphor sheet 4. When the detected energy level is within or below the aforesaid range, the switch 16$c$ is turned off to extinguish the noise erasing light source 11. In this embodiment, since noise detection and noise erasing are conducted simultaneously, noise can always be erased completely with the minimum number of parts constituting the apparatus.

FIG. 7 shows the sixth embodiment of the apparatus in accordance with the present invention, in which the amount of exposure to the erasing light is controlled by use of a preliminary read-out means for detecting in advance the recording information of the radiation image stored on the stimulable phosphor sheet. The stimulable phosphor sheet 4 carrying a radiation image stored thereon is first positioned at the preliminary read-out section, in which the preliminary read-out is conducted for investigating the recording information of the radiation image. The preliminary read-out is carried out approximately in the same way as the operation for reading out the radiation image for the viewing and diagnostic purposes. Namely, a laser beam 22 emitted from a laser source 21 is deflected by a light deflector 23 in order to scan the phosphor sheet 4 in one direction. During this scanning, the phosphor sheet 4 is moved at a predetermined speed by the transfer rollers 5, so that the whole surface of the phosphor sheet 4 is exposed to and scanned with the laser beam 22. The phosphor sheet 4 emits light upon stimulation thereof by the laser beam 22, and the emitted light is entered into a light guiding sheet 26 and then detected by a photomultiplier 27. The signal detected by the photomultiplier 27 is amplified by an amplifier 28 and then sent to a control circuit 29. On the basis of the recording information of the radiation image obtained by the preliminary read-out, the control circuit 29 generates a read-out gain setting value (a), a scale factor setting value (b), an image processing condition setting value (c), and an exposure amount setting value (d). When the preliminary read-out is finished as described above, the phosphor sheet 4 is moved by the transfer rollers 5 to the image read-out step. The image read-out is conducted in the same way as described with reference to FIG. 2. Namely, the phosphor sheet 4 is stimulated by the laser beam 2 and emits lights in an amount corresponding to the radiation image stored thereon. The emitted light is detected by the photomultiplier 7, and the detected image signal is amplified to an appropriate level by the amplifier 8 the sensitivity of which has been set by the read-out gain setting value (a). The amplified electric signal is then sent to an A/D converter 30. In the A/D converter 30, the electric signal is converted to a digital signal with a scale factor which has been set by the scale factor setting value (b) to suit the width of signal fluctuation. The digital signal thus obtained is sent to a signal processing circuit 31, in which it is processed based on the image processing condition setting value (c) so as to obtain a visible image suitable for viewing and diagnostic purposes. The signal thus processed is sent to a recording apparatus. When the image read-out is finished, the phosphor sheet 4 is moved to the position below the noise erasing light source 11 by the transfer rollers 5 and maintained there. At this stage, the timer 13 connected to the power source 12 is turned on, and the noise erasing light source 11 starts emitting light onto the phosphor sheet 4. When the erasing light emitting period which has been set by the exposure amount setting value (d) elapses, the timer 13 is turned off, and the noise erasing light source 11 is extinguished to finish the noise erasing operation.

In the embodiment of FIG. 7, the exposure amount is controlled by controlling the noise erasing period according to the exposure amount setting value (d). However, it is also possible to maintain the erasing period constant and control the electric power applied to the noise erasing light source 11, thereby to adjust the light emitting power thereof. Further, since the read-out gain setting value (a) is determined according to the level of residual radiation energy, it is also possible to use the read-out gain setting value (a) directly as the exposure amount setting value (d). In this case, the read-out apparatus and the noise erasing apparatus can be constructed integrally to form a simple apparatus.

It should be understood that the present invention can be embodied in various ways other than the above described embodiments.

The present invention is further illustrated by the following example.

EXAMPLE

A plurality of stimulable phosphor sheets were exposed to X-rays of different doses to have radiation energy stored thereon.

Thereafter, each stimulable phosphor sheet was exposed to a tungsten-filament lamp for 100 seconds to investigate the power of the lamp necessary for reducing noise to a level within the range between 0.01 and 0.0001. In the evaluation of experiment results, the radiation energy level stored by exposing the phosphor sheet to X-rays of a dose of 10 mR was taken as 100.

The experiments revealed that noise can be sufficiently eliminated by exposing the phosphor sheet to erasing light emitted from the tungsten-filament lamp for 100 seconds at a power of 3 kW for a radiation energy level of 100, 1.5 kW for a radiation energy level within the range between 10 and 1, and 0.6 kW for a radiation energy level within the range between 1 and 0.1.

Further, various stimulable phosphor sheets carrying radiation energy stored thereon were exposed to a 3 kW tungsten-filament lamp for various periods of time to investigate the exposure time required for noise to be reduced to a level within the range between 0.01 and 0.0001. It was found that noise can be sufficiently eliminated by exposing the phosphor sheets to the lamp for 100 seconds for a stored radiation energy level of 100, 50 seconds for a level within the range between 10 and 1, and 20 seconds for a level within the range between 1 and 0.1.

We claim:

1. In a noise erasing method for a stimulable phosphor sheet capable of being repeatedly used for radiation image recording and read-out, in which development of noise at the time of radiation image read-out is eliminated by exposing the stimulable phosphor sheet to light prior to the radiation image recording on the stimulable phosphor sheet,
   the noise erasing method for the stimulable phosphor sheet comprising the steps of: detecting the level of residual radiation energy remaining on said stimulable phosphor sheet, and controlling the exposure amount of said stimulable phosphor sheet to said light according to the detected level of residual radiation energy.

2. A noise erasing method as defined in claim 1 wherein said exposure amount is controlled to erase residual radiation energy to a level within the range between 0.01 and 0.0001 with the maximum of the originally stored radiation energy taken as 100.

3. A noise erasing method as defined in claim 1 wherein the level of residual radiation energy is determined based on the electric image signal read out from said stimulable phosphor sheet at the read-out step conducted for obtaining a visual image for viewing and diagnostic purposes.

4. A noise erasing method as defined in claim 1 wherein the level of residual rediation energy is determined based on recording information obtained by a preliminary read-out step which is conducted to investigate the recording information for determining read-out conditions.

5. A noise erasing method as defined in claim 1 wherein the level of residual radiation energy is determined by detecting light instantaneously emitted from said stimulable phosphor sheet when said stimulable phosphor sheet is exposed to a radiation at first in the recording step.

6. A noise erasing apparatus for a stimulable phosphor sheet capable of being repeatedly used for radiation image recording and read-out, which comprises a means for exposing said stimulable phosphor sheet to light in order to erase noise prior to radiation image recording on said stimulable phosphor sheet, a means for detecting the level of residual radiation energy remaining on said stimulable phosphor sheet, and a means for controlling the exposure amount of said stimulable phosphor sheet to said light according to the detected level of residual radiation energy.

7. A noise erasing apparatus as defined in claim 6 wherein said means for detecting the level of residual radiation energy is a means for detecting a value corresponding to the residual rediation energy level from an output of a radiation image read-out means.

8. A noise erasing apparatus as defined in claim 6 wherein said means for detecting the level of residual radiation energy is a means for detecting a value corresponding to the residual radiation energy level from an output obtained by preliminary read-out conducted to investigate the recording information for determining read-out conditions.

9. A noise erasing apparatus as defined in claim 6 wherein said means for detecting the level of residual radiation energy comprises a means for scanning said stimulable phosphor sheet with a laser beam.

10. A noise erasing apparatus as defined in claim 6 wherein said means for detecting the level of residual radiation energy comprises a light source capable of emitting light to the whole surface of said stimulable phosphor sheet at a time.

11. A noise erasing apparatus as defined in claim 10 wherein said means for detecting the level of residual radiation energy also serves as said means for exposing said stimulable phosphor sheet to light in order to erase noise.

12. A noise erasing apparatus as defined in claim 6 wherein said means for controlling the exposure amount comprises a power controller for controlling the electric power applied to said means for exposing said stimulable phosphor sheet to light in order to erase noise.

13. A noise erasing apparatus as defined in claim 6 wherein said means for controlling the exposure amount comprises a timer for timing the turning on and off of said means for exposing said stimulable phosphor sheet to light in order to erase noise.

14. A noise erasing apparatus as defined in claim 6 wherein said means for controlling the exposure amount comprises at least one comparator and at least one switch for turning on and off said means for exposing said stimulable phosphor sheet to light in order to erase noise.

15. A noise erasing apparatus as defined in claim 6 wherein said means for controlling the exposure amount controls the exposure amount to erase residual radiation energy to a level within the range between 0.01 and 0.0001 with the maximum of the originally stored radiation energy taken as 100.

* * * * *